United States Patent [19]

Hammer et al.

[11] Patent Number: 4,495,704
[45] Date of Patent: Jan. 29, 1985

[54] MICROTRANSLATOR AND MICROTRANSLATOR ASSEMBLY

[75] Inventors: Jacob M. Hammer, Princeton, N.J.; Clyde C. Neil, Levittown, Pa.

[73] Assignee: RCA Corporation, New York, N.Y.

[21] Appl. No.: 505,737

[22] Filed: Jun. 20, 1983

[51] Int. Cl.³ .............................................. G01B 5/00
[52] U.S. Cl. .................................. 33/180 R; 33/162; 33/174 S; 33/181 R
[58] Field of Search ................. 33/180 R, 181 R, 162, 33/168 B, 147 G, 174 S; 74/107, 89.15

[56] References Cited

U.S. PATENT DOCUMENTS 2,782,682  2/1957  Browning et al. ................ 33/180 R
3,608,201  9/1971  Butsch ................................... 33/162
3,645,001  2/1972  Bosworth et al. ..................... 33/162
3,798,757  3/1974  Hennessey et al. ............... 33/181 R Primary Examiner—Willis Little
Attorney, Agent, or Firm—Joseph S. Tripoli; George E. Haas; George J. Seligsohn

[57] ABSTRACT

The setting of a screw-operated tapered rod is used to control the separation between a spring-loaded beam element and a base element of a microtranslator with a positioning resolution of the order of 200 nanometers or less in a direction substantially parallel to a given single axis. A microtranslator assembly incorporating two such microtranslators oriented substantially perpendicular to one another is suitable for aligning a laser diode with a single-mode optical fiber to effect maximum coupling of light therebetween.

6 Claims, 3 Drawing Figures

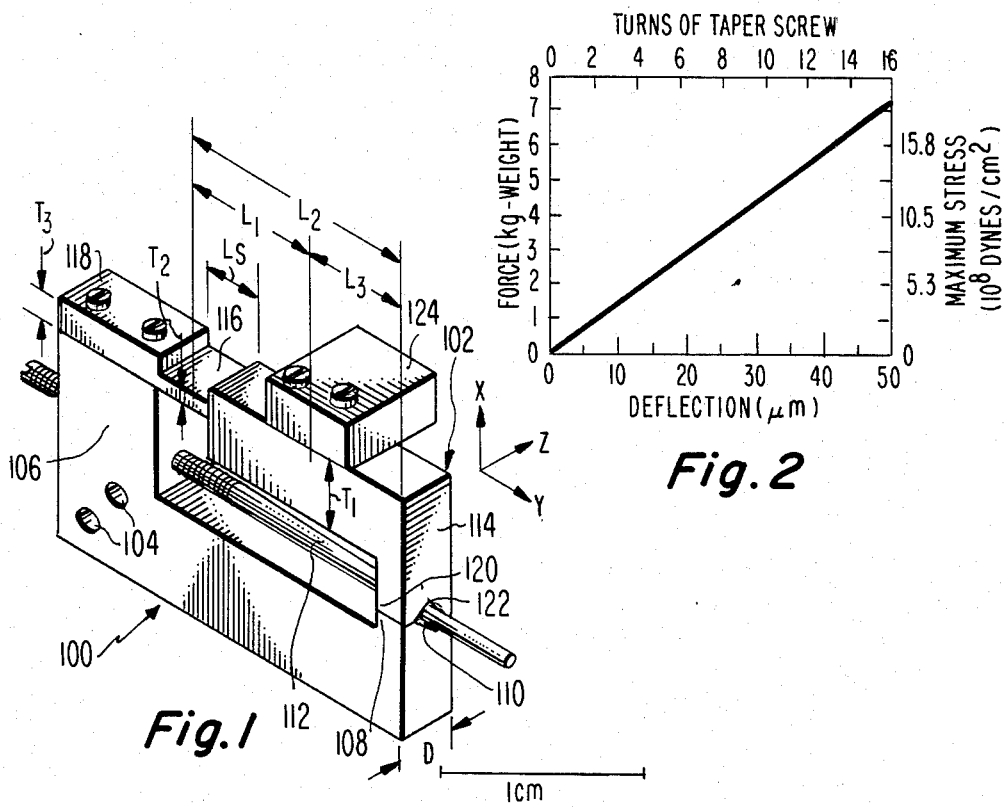
Fig.1
Fig.2
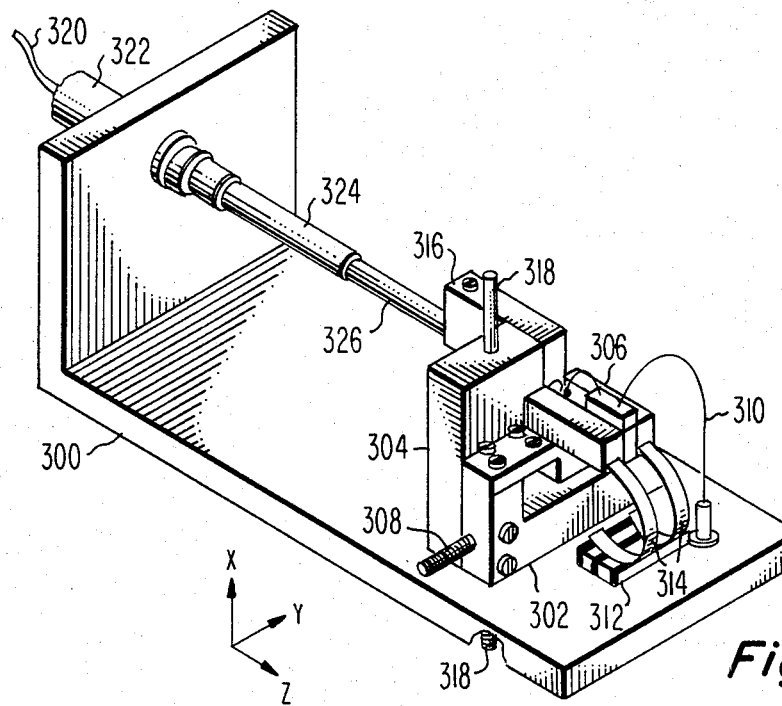
Fig.3

MICROTRANSLATOR AND MICROTRANSLATOR ASSEMBLY

The Government has rights in this invention pursuant to Contract No. N-00014-81-C-2522 awarded by the Department of the Navy.

This invention relates to microtranslators and, more particularly, to microtranslators suitable for optically coupling devices such as a diode laser to a single-mode optical fiber, an optical fiber to another optical fiber, an optical fiber to a thin-film (integrated optic) waveguide, a thin-film waveguide to another thin-film waveguide, etc., in which extremely accurate positioning of the coupling components with respect to one another is essential. Such microtranslators should provide stable positioning with a positioning resolution of the order of 200 nanometers or better. Further, because of thermal effects and aging effects (such as small shifts in the location of a diode laser's output) a postpackaging adjustment capability having this high positioning resolution is desirable. In particular, in coupling a diode laser to a single-mode fiber, a single-mode waveguide or other external types of elements which might provide feedback, such postpackaging positioning capability is critical.

The microtranslators of the present invention provide a solution to this problem using means, such as tapered rods driven by screws, to move spring loaded beams. This technique allows limited motion to effect the adjustment of the relative position of elements, to be made after the elements are assembled together in a package or module. Yet, a microtranslator of the present invention is small, stable, has high positioning resolution and is manufacturable using conventional machine shop techniques.

More specifically, the present invention is directed to a microtranslator for holding a device and translating the device with a positioning resolution of the order of 200 nanometers or less in a direction substantially parallel to a given spatial axis. The microtranslator comprises a stationary rigid base element having a longitudinal dimension perpendicular to the given axis. A beam element is situated in cooperative spatial relationship with the base element. The beam element has a longitudinal dimension oriented substantially parallel to the longitudinal dimension of the base element. The base element supports a holder for the device which is located at a given position along the longitudinal dimension of the beam elment. A spring element couples the beam element to the base element to permit limited movement over a range of the beam element with respect to the base element. The movement is in a direction essentially parallel to the given axis. The spring element is biased so as to urge the beam element in the direction of movement toward the base element. Precision adjustment means coupled to the beam and base elements control the amount of separation between the beam and base elements, thereby varying the value of the bias of the spring element as a given linear function of the amount of separation between the beam and base elements. The adjustment means is settable with a precision which provides a positioning resolution in the value of the separation spacing distance between the beam and base elements at the given position of the device holder of the order of 200 nanometers or less.

In the drawings:

FIG. 1 diagramatically illustrates a preferred embodiment of a microtranslator incorporating the principles of the present invention;

FIG. 2 is a graph helpful in explaining the operation of the microtranslator shown in FIG. 1; and FIG. 3 is a diagrammatic illustration of a microtranslator assembly, incorporating first and second separate microtranslators of the type shown in FIG. 1, useful in optically coupling a beam of light from a diode laser to a single-mode optical fiber.

The microtranslator shown in FIG. 1 comprises first and second longitudinal members 100 and 102. As indicated in FIG. 1, each of members 100 and 102 has its longitudinal dimension substantially parallel to a Y spatial axis; its height dimension substantially parallel to an X spatial axis; and its depth dimension substantially parallel to a Z spatial axis. First member 100 comprises a base element having a length of about 2 centimeters with a depth D. Through the depth of base element 100 are two mounting holes 104. Base element 100 includes, at the left end thereof, vertically-extending mounting region 106. Base element 100 further includes, at the right end thereof, a vertically-extending adjustment region 108. Adjustment region 108 comprises V-groove 110 cut therein. Supported in groove 110 is the unthreaded tapered section of a screw-operated rod 112. A precision threaded section of tapered rod 112 passes through a threaded hole in mounting region 106. The end of the threaded section of tapered rod 112 includes a notch for receiving a screw driver for turning tapered rod 112, thereby moving the tapered section of rod 112 with respect to V-groove 110 longitudinally in the Y direction.

Second member 102 is comprised of first, second and third longitudinal serial sections 114, 116 and 118 along the length thereof. First section 114 has a first given thickness $T_1$ sufficiently thick to maintain first section 114 substantially rigid, so that first section 114 constitutes a beam element. Second section 116 has a second given thickness, $T_2$, sufficiently thin to be flexible, so that second station 116 constitutes a spring element. Third section 118, which constitutes a mounting section, has a thickness $T_3$ equal to or larger than $T_2$. First-section beam element 114, at the right end thereof, includes an adjustment region 120 having a V-groove 122 cut therein. Adjustment region 120 of first-section beam element 114 is oriented in cooperative relationship with adjustment region 108 of base element 100, with the tapered section of rod 112 passing through V-groove 122. At the interface of adjustment regions 108 and 120, the tapered section of tapered rod, 112 in passing through the aperture formed by V-groove 110 and 122, slightly separates beam element 114 from base element 100 by an amount which depends upon the setting of the screw-operated threaded rod 112.

Mounting section 118 of second member 102 (which is similar in size to mounting region 106 of first member 100) is fixedly secured by screws to mounting region 106 in a manner that permits second-section spring element 116 of second member 102 to be biased by an amount which in value is a given linear function of the amount of separation between beam element 114 and base element 100 (hence a linear function of the setting of tapered rod 112).

Fixedly secured to and supported by element 114 is device holder 124. As indicated in FIG. 1, the length of spring element 116 is $L_S$. The longitudinal distance from the middle of spring element 116 to the middle of device holder 124 is $L_1$ and the distance between the middle of spring element 116 and the right end of first-section beam element 114 is $L_2$. Therefore, the distance between the middle of device holder 124 and the right end of beam element 114 is $L_3$.

The microtranslator shown in FIG. 1 has been constructed, employing phosphor bronze material for first and second members 100 and 102 and employing #416 stainless steel for tapered rod 112. The Young's modulus and tensile strength of phosphor bronze provides a desirable deflection characteristic for spring element 116, while the hardness and ability to be polished of #416 stainless steel provides desirable precision in adjustment setting of tapered rod 112. Further, the respective thermal expansions of phosphor bronze and of #416 stainless steel are sufficiently close to one another to provide a good match in thermal properties, so that temperature-induced relative motion among the parts is minimized. Dimensions chosen in the constructed microtranslator are as follows: $L_1=0.72$ cm, $L_2=1.4$ cm, $L_3=0.68$ cm, $D=0.5$ cm, $L_S=0.25$ cm, $T_2=0.125$ cm.

FIG. 2 calculates the force required to deflect the microtranslator of FIG. 1 vs deflection. The right-hand scale gives maximum stress. The upper scale gives the number of turns of tapered rod 112 corresponding to deflection shown in the lower scale. The slope of the graph shown in FIG. 2 is 0.145 (kilogram-weight)/micrometer. The deflection is plotted at the position of device holder 124.

Assuming that the total weight of beam element 114 and device holder 124 and a device being held by device holder 124 is approximately 10 grams, the value of 0.145 (kg-wt)/um results in a deflection of only 0.28 um, corresponding to an acceleration equal to four times the acceleration due to gravity along the X spatial axis (the compliant direction of spring element 116). This is the acceleration which would result from the microtranslator of FIG. 1 being accelerated in the X direction from zero to 100 kilometers/hour in one second. Thus, the microtranslator of the present invention provides stable positioning of the held device.

Screw-operated tapered rod 112 may be set with a precision tolerance of 1/20th of a screw turn. This provides a resolution in the value of the separation spacing distance between beam element 114 and base element 100 at the given position of device holder 124 in the order of 200 nanometers or less.

By comparing the deflection in micrometers shown in FIG. 2 with the spacing distance $L_1=0.72$ cm, it is seen that the deflection angle of spring element 116 is sufficiently small that the sine of the deflection angle is substantially equal to the angle itself in radians and the cosine of the deflection angle is substantially equal to one. Therefore, the translation of beam element 114, in general, and translation of device holder 124, in particular, is substantially parallel to the X axis in FIG. 1 over the limited range of movement through which beam element 114 is deflected. This is true despite the fact that beam element 114 is effectively rotationally pivoted about the midline of spring element 116 in the preferred embodiment of the present invention shown in FIG. 1.

A benefit of the arrangement shown in FIG. 1 is that the change in the amount of separation spacing distance between beam element 114 and base element 100 at the given position of device holder 124 is equal to only the ratio $L_1/L_2$ of the change in the amount of separation spacing distance between adjustment regions 120 and 108. Thus, in the arrangement shown in FIG. 1, beam element 114 forms a pivoted lever exhibiting a mechanical advantage that effectively increases the positioning resolution capability of the microtranslator shown in FIG. 1. However, it should be understood that the present invention is not limited to the particular arrangement shown in FIG. 1 in which beam element 114 forms a pivoted lever. Any arrangement is contemplated by the present invention in which the beam element is coupled to the base element to permit limited movement over a range of the beam element with respect to the base element, with the movement being in a direction essentially parallel to the X axis of FIG. 1 and with the spring element being biased so as to urge the beam element in X direction toward the base element.

Referring to FIG. 3, there is shown support bracket 300 supporting first microtranslator 302 and second microtranslator 304. Each of microtranslators 302 and 304 is of the type shown in FIG. 1. As shown in FIG. 3, microtranslators 302 and 304 are rigidly secured to one another and to support bracket 300. As indicated by the respective directions of the X, Y and Z spatial axes shown in FIG. 3, first microtranslator 302 is oriented with its longitudinal dimension spatially parallel to the Y axis. First microtranslator 302 has diode-laser assembly 306 mounted on its device holder. The setting of screw-operated tapered rod 308 of first microtranslator 302 causes limited movement of mounted diode laser assembly 306 in a direction substantially parallel to the X axis. Associated with the diode laser of assembly 306 is electrical feed 310 supplying energization from an external power supply to the diode laser over a connection that feeds through the base plate of bracket 300. Also associated with assembly 306 is thermoelectric cooler 312, mounted to the base plate of bracket 300, which is coupled to assembly 306 through copper foil leads 314.

Second microtranslator 304, which is oriented with its longitudinal dimension substantially parallel to the X axis, provides limited movement substantially parallel to the Y axis of block 316 in response to the setting of screw-operated tapered rod 318.

Single-mode optical fiber 320 passes through the end plate of bracket 300 to block 316 encased, respectively, in stiff plastic sleeve 322, PVC (polyvinylchloride) jacket 324 and stainlss steel ferrule 326. Fiber 320 is bonded to ferrule 326 by a clear epoxy, and the end of fiber 320, at block 316, is polished flush with the end of ferrule 326.

During assembly, the distance substantially parallel to the Z axis between the end of optical fiber 320 and the laser-diode of assembly 306 can be adjusted by moving ferrule 326 in block 316 to obtain the correct spacing between the optical fiber and diode laser.

Screw-operated tapered rods 308 and 318 are utilized to precisely more diode laser assembly 306 substantially parallel to the X axis and block 316 substantially parallel to the Y axis, with a positioning resolution of 200 nanometers or less, so as to bring the diode laser of 306 into such alignment with the input end of fiber 320 that a maximum amount of laser light is optically coupled into single mode optical fiber 320. The microtranslator assembly shown in FIG. 3 further includes a sealing cover (not shown) attached to bracket 300, which encapsulates the entire assembly. However, threaded section of rod 318 passes through the bottom plate of bracket 300 and threaded section of tapered rod 308 passes through the cover, so that repositioning of diode-laser assembly 306 in the X direction and repositioning of block 316 in the Y direction can be done whenever required to maintain the laser-diode assembly 306 and single-mode optical fiber 320 in proper alignment.

The setting of screw-operated tapered rods 308 and 318 may be accomplished manually with a screw driver or, alternatively, a servo mechanism may be utilized to set tapered rods 308 and 318 so as to maintain maximum optical coupling between the diode-laser assembly 306 and single-mode optical fiber 320.

What is claimed is:

1. A microtranslator for holding a device and translating said device, with a positioning resolution of the order of 200 nanometers or less, in a direction substantially parallel to a given spatial axis; said microtranslator comprising:
a stationary rigid base element having a longitudinal dimension perpendicular to said given axis;
a rigid beam element situated in cooperative spatial relationship with said base element with a longitudinal dimension of said beam element being oriented substantially parallel to the longitudinal dimension of said base element, said beam element supporting a holder for said device which is located at a given position along the longitudinal dimension of said beam element;
a spring element coupling said beam element to said base element to permit limited movement over a range of said beam element with respect to said base element, said movement being in a direction essentially parallel to said given axis, with said spring element being biased so as to urge said beam element in a direction of movement toward said base element; and
precision adjustment means coupled to said beam and base elements for controlling the amount of separation between said beam and base elements and thereby varying the value of said bias of said spring element as a given linear function of the amount of said separation between said beam and base elements, said adjustment means being settable with a precision which provides a positioning resolution in the value of the separation spacing distance between said beam and base elements at said given position along the longitudinal dimension of said beam element of the order of 200 nanometers or less.

2. The microtranslator defined in claim 1, including:
a first longitudinal member of which said base element is comprised and a second longitudinal member of which said beam and spring elements are comprised;
said first member including longitudinally displaced adjustment and mounting regions along the length thereof;
said second member comprising first, second and third longitudinal serial sections in that order along the length thereof, with said first section having a first given thickness sufficiently thick to maintain said first section substantially rigid constituting said beam section, with said second section having a second given thickness sufficiently thin to be flexible constituting said spring element, and with said third section constituting a mounting section;
said first-section beam element including an adjustment region in cooperative relationship with said adjustment region of said base element, with the respective adjustment regions of said beam and base elements being separated from one another by said adjustment means; and
said mounting section of said second member being fixedly secured to said mounting region of said first member in a manner to permit said second-section spring element of said second member to be biased by the setting of said adjustment means to urge the adjustment region of said first-section beam element of said second member toward the adjustment region of said first member base element.

3. The microtranslator defined in claim 2, wherein:
each of said adjustment regions of said first and second members is comprised of a V-groove, having substantially the same longitudinal position along said respective members as one another thereby together to form an aperture; and
said adjustment means comprises a tapered screw which passes through said aperture and is substantially aligned with said longitudinal dimension of said first and second members.

4. The microtranslator defined in claim 2, wherein:
said holder is longitudinally displaced a second given distance $L_1$ from said spring means which is smaller than $L_1$; and
said adjustment regions are longitudinally displaced a first given distance $L_2$ from said spring element; and
whereby a change in the amount of separation between said beam and base elements at said adjustment regions thereof results in said holder being translated a distance substantially parallel to said given axis equal to only the fraction $L_1/L_2$ of said change in the amount of separation.

5. A microtranslator assembly for aligning first and second devices with respect to one another with a positioning resolution of the order of 200 nanometers or less, said assembly comprising:
first and second separate microtranslators each of which includes (1) a stationary rigid base element having a longitudinal dimension, (2) a rigid beam element situated in cooperative spatial relationship with said base element with a longitudinal dimension of said beam element being oriented substantially parallel to the longitudinal dimension of said base element, (3) a spring element coupling said beam element to said base element to permit limited movement of said beam element over a range with respect to said base element, said movement being essentially perpendicular to the longitudinal dimension of said beam and said base elements, with said spring element being biased so as to urge said beam element in a direction of movement toward said base element, and (4) precision adjustment means coupled to said beam and base elements for controlling the amount of separation between said beam and base elements and thereby varying the value of said bias of said spring element as a given linear function of the amount of said separation between said beam and base elements;
said first microtranslator being oriented to permit said limited movement of its beam element substantially parallel to a given first spatial axis that is oriented perpendicular to its longitudinal dimension and said beam element of said first microtranslator supporting a holder for said first device which is located at a first given position along the longitudinal dimension thereof;

said second microtranslator being oriented to permit said limited movement of its beam element substantially parallel to a second spatial axis that is oriented perpendicular to its longitudinal dimension and substantially parallel to said longitudinal dimension of said first microtranslator, said beam element of said second microtranslator supporting a holder for said second device at a second given position along the longitudinal dimension thereof;

said first and second microtranslators being displaced from one another along a third spatial axis oriented substantially perpendicular to both said first and second axes and the relative placement of said first and second microtranslators being such that said respective ranges of limited movement permit said first and second devices to assume certain respective spatial positions with respect to one another that define a line oriented parallel to said third axes; and wherein said respective adjustment means of said first and second microtranslators are settable with a precision which provides a positional resolution at said device holders of the order of 200 nanometers or less so that said certain respective spatial positions can be set with this positional resolution.

6. The assembly defined in claim 5, wherein said first device is a single-mode diode laser and said second device is a single-mode optical fiber, whereby optical coupling between said laser and said optical fiber is achieved when said certain respective spatial positions are set with said positional resolution.

* * * * *